(12) United States Patent
Hebenstreit

(10) Patent No.: US 10,098,355 B2
(45) Date of Patent: Oct. 16, 2018

(54) SYSTEM AND METHOD FOR WEIGHING ITEMS

(71) Applicant: Paul Hebenstreit, St. Louis, MO (US)

(72) Inventor: Paul Hebenstreit, St. Louis, MO (US)

(73) Assignee: BAKERY SYSTEMS, INC., St. Louis, MO (US)

( * ) Notice: Subject to any disclaimer, the term of this patent is extended or adjusted under 35 U.S.C. 154(b) by 728 days.

(21) Appl. No.: 14/548,034

(22) Filed: Nov. 19, 2014

(65) Prior Publication Data

US 2016/0135471 A1    May 19, 2016

(51) Int. Cl.
| | | |
|---|---|---|
| A21C 5/00 | (2006.01) | |
| G05B 13/04 | (2006.01) | |
| G01G 13/02 | (2006.01) | |
| G01G 23/16 | (2006.01) | |
| G01G 11/00 | (2006.01) | |
| G01G 23/01 | (2006.01) | |
| G01G 13/06 | (2006.01) | |

(52) U.S. Cl.
CPC .............. *A21C 5/00* (2013.01); *G01G 11/003* (2013.01); *G01G 13/02* (2013.01); *G01G 23/01* (2013.01); *G01G 23/163* (2013.01); *G05B 13/041* (2013.01); *G01G 13/026* (2013.01); *G01G 13/06* (2013.01)

(58) Field of Classification Search
CPC ...... A21C 5/00; G01G 11/003; G01G 13/026; G01G 13/24; G01G 13/248; G01G 23/01; G01G 23/163; G01G 23/3707; G05B 13/041
See application file for complete search history.

(56) References Cited

U.S. PATENT DOCUMENTS

| | | | |
|---|---|---|---|
| 2,967,703 A | | 1/1961 | Jones |
| 3,276,525 A | * | 10/1966 | Cass ...................... G01G 3/147 177/1 |
| 3,539,028 A | | 11/1970 | Krolopp |
| 3,805,903 A | | 4/1974 | Muskat et al. |
| 3,913,691 A | | 10/1975 | Powell, Jr. |
| 3,921,737 A | | 11/1975 | Pleus |
| 3,995,517 A | | 12/1976 | Smith |
| 3,997,013 A | | 12/1976 | Brook |
| 4,038,531 A | | 7/1977 | Loe, Jr. |
| 4,114,707 A | | 9/1978 | Del Rosso |
| 4,130,171 A | | 12/1978 | Smith et al. |

(Continued)

FOREIGN PATENT DOCUMENTS

| | | |
|---|---|---|
| EP | 534889 | 3/1993 |
| EP | 2416128 | 2/2012 |

*Primary Examiner* — Randy Gibson
(74) *Attorney, Agent, or Firm* — Bryan Cave Leighton PaisnerLLP

(57) ABSTRACT

An apparatus and method for automatically removing dough pieces from overhead dough proffer, weighing the dough pieces and reinserting them back in to the process stream. The weight information is analyzed to determine whether it represents the weight of pieces or the empty scale weight, and may be used to provide a signal proportional to the weight of a dough portion, or group of dough potions in order to automatically adjust the rate at which dough is fed to the dividing mechanism, thereby increasing or decreasing the dough piece weights to maintain the desired amount of dough per piece.

6 Claims, 2 Drawing Sheets

(56) References Cited

U.S. PATENT DOCUMENTS

| | | | |
|---|---|---|---|
| 4,136,504 A | 1/1979 | Wyslotsky | |
| 4,163,488 A | 8/1979 | Brook | |
| 4,231,439 A * | 11/1980 | Hall, Jr. | G01G 19/035 177/1 |
| 4,233,255 A | 11/1980 | Moon | |
| 4,379,495 A * | 4/1983 | Cocks | G01G 23/3707 177/1 |
| 4,382,761 A | 5/1983 | Daubenbuchel et al. | |
| 4,412,298 A * | 10/1983 | Feinland | G01G 23/3707 177/25.14 |
| 4,420,051 A | 12/1983 | Furuta et al. | |
| 4,494,582 A | 1/1985 | Meyer | |
| 4,553,619 A * | 11/1985 | Fujinaga | G01G 23/3707 177/1 |
| 4,631,021 A | 12/1986 | Hayashi | |
| 4,660,662 A * | 4/1987 | Katz | G01G 23/3707 177/185 |
| 4,681,176 A | 7/1987 | Moran et al. | |
| 4,692,107 A | 9/1987 | Morikawa et al. | |
| 4,696,329 A | 9/1987 | Izzi | |
| 4,709,770 A * | 12/1987 | Kohashi | G01G 3/1414 177/185 |
| 4,762,252 A | 8/1988 | Hyer et al. | |
| 4,794,996 A | 1/1989 | Wallace et al. | |
| 4,883,417 A | 11/1989 | Morikawa et al. | |
| 4,902,524 A | 2/1990 | Morikawa et al. | |
| 4,960,601 A | 10/1990 | Cummins | |
| 4,967,857 A | 11/1990 | Kent et al. | |
| 5,046,570 A | 9/1991 | Emme et al. | |
| 5,073,391 A | 12/1991 | DeMars et al. | |
| 5,106,636 A | 4/1992 | Ban et al. | |
| 5,109,936 A | 5/1992 | Ruppel | |
| 5,150,758 A | 9/1992 | Gmuer | |
| 5,158,792 A | 10/1992 | Morikawa et al. | |
| 5,159,959 A | 11/1992 | Bohm | |
| 5,191,947 A | 3/1993 | Petersen | |
| 5,200,203 A | 4/1993 | Hayashi | |
| 5,232,713 A | 8/1993 | Morikawa et al. | |
| 5,244,100 A | 9/1993 | Regier | |
| 5,292,539 A | 3/1994 | Tashiro et al. | |
| 5,296,654 A | 3/1994 | Farley et al. | |
| 5,314,322 A | 5/1994 | Morikawa et al. | |
| 5,319,160 A | 6/1994 | Nambu | |
| 5,723,824 A | 3/1998 | Stadler | |
| 6,007,236 A | 12/1999 | Maguire | |
| 6,073,667 A | 6/2000 | Graffin | |
| 6,080,938 A * | 6/2000 | Lutz | G01G 23/166 177/25.15 |
| 6,215,078 B1 * | 4/2001 | Torres | G01G 19/4144 177/25.15 |
| 6,235,998 B1 | 5/2001 | Brewer | |
| 6,407,346 B1 | 6/2002 | Baker | |
| 6,441,321 B1 | 8/2002 | Hebenstreit | |
| 6,468,570 B1 | 10/2002 | Haddad et al. | |
| 6,511,689 B2 | 1/2003 | Lowry et al. | |
| 6,521,847 B1 | 2/2003 | Ostermann | |
| 6,725,165 B1 * | 4/2004 | Knox | B60N 2/002 177/144 |
| 7,154,055 B2 | 12/2006 | Hebenstreit | |
| 7,241,955 B2 | 7/2007 | Hebenstreit | |
| 7,270,051 B2 | 9/2007 | Hayashi et al. | |
| 7,402,762 B2 | 7/2008 | Draper et al. | |
| 7,812,267 B2 | 10/2010 | Draper et al. | |
| 7,902,467 B2 * | 3/2011 | Suzuki | G01G 23/16 177/50 |
| 8,106,315 B2 | 1/2012 | Turner | |
| 8,129,635 B2 | 3/2012 | Turner | |
| 8,153,911 B2 | 4/2012 | Turner | |
| 8,274,001 B2 | 9/2012 | Uber | |
| 8,330,060 B2 | 12/2012 | Duppre | |
| 8,353,234 B2 | 1/2013 | Takama et al. | |
| 8,481,870 B2 | 7/2013 | Turner | |
| 8,481,871 B2 | 7/2013 | Turner | |
| 8,530,762 B2 | 9/2013 | Turner | |
| 8,579,494 B2 | 11/2013 | Holt et al. | |
| 8,735,745 B2 | 5/2014 | Rossi | |
| 8,987,613 B2 | 3/2015 | Turner | |
| 9,018,544 B2 | 4/2015 | Turner | |
| 9,091,585 B2 | 7/2015 | Turner | |
| 9,146,148 B2 | 9/2015 | Turner | |
| 2005/0167163 A1 | 8/2005 | Hebenstreit | |
| 2005/0194193 A1 | 9/2005 | Hebenstreit | |
| 2010/0082389 A1 | 4/2010 | Turner | |

\* cited by examiner

SYSTEM AND METHOD FOR WEIGHING ITEMS

FIELD OF THE INVENTION

The described invention relates to an apparatus and method for weighing and adjusting the weight of dough pieces passing through a dough proffer at high production rates.

BACKGROUND OF THE INVENTION

Commercial dough production often involves production of large quantities of dough which are continuously divided into portions using various types of dividing mechanisms, after the dough pieces are divided they are often rounded in shape and received in to a dough proofing system that allows the dough pieces to rest before they are moulded and placed, in pans for baking or further processing. Due to the difficulty in maintaining a constant weight of divided dough portions at high production rates, a need remains for a system to continuously monitor and control the weight of divided dough portions at high production rates without human intervention. Preferably, such a system would minimize the variations in the weight of dough portions from a desired weight by automatically calculating and implementing precise adjustments to the controller of the dough feeding mechanism.

SUMMARY OF THE INVENTION

The present invention satisfies these needs and provides an apparatus and method for continuously monitoring the weight of divided dough portions at high production speeds, and is capable of providing corrective signals proportional to the weight deviation of each dough portion or a predetermined number of portions in a sample group from the desired portion weight. The magnitude of the dough divider feed rate control adjustment signal is also configurable for the specific application requirements.

One embodiment of the present invention comprises a dough production mechanism, a dough feed mechanism, a dividing mechanism, a weighing mechanism, a weight signal processor to calculate and transmit appropriate control signals to the dough feed mechanism, a conveyor system configured to transport dough portions from the dividing mechanism to the proofer mechanism, a tipping mechanism to place dough portions on the weighing conveyors, that reinsert the dough pieces in position for further processing. The speed of the weighing conveyor is variable to accommodate the range of production speeds.

The apparatus removes a complete proofer tray of dough pieces, weighing each dough piece individually. The user may select the percentage of the entire dough piece population for weight sampling. The weigh sampling can be configured to sample, for example, 100 percent of the population for lower production rates, to approximately 25 percent for very high production rates. This weight sample information is calculated in comparison to the desired dough piece target weight. A corrective signal is sent to the portioning device to continuously produce constant weight portions of dough, and more particularly, to such apparatus and method whereby variations in the weight of each portion are minimized by automatically adjusting the rate at which the dough is fed to the dividing mechanism.

The weighing mechanism consists of tipping apparatus that causes the dough pieces to fall from the moving trays that carry them through the proffer. After the tray is tipped, the dough pieces fall onto individual weigh conveyors. These conveyors automatically match the speed of the proffer trays to deliver the dough pieces back into the process stream without interruption before molding. The apparatus removes a complete proofer tray of dough pieces, weighing each dough piece individually. The user may select the percentage of the entire dough piece population for weight sampling. The weigh sampling can be configured to sample, for example, 100 percent of the population for lower production rates, to approximately 25 percent for very high production rates. This weight sample information is calculated in comparison to the desired dough piece target weight. A corrective signal is sent to the portioning device to continuously produce constant weight portions of dough, and more particularly, to such apparatus and method whereby variations in the weight of each portion are minimized by automatically adjusting the rate at which the dough is fed to the dividing mechanism. Adjustments to the portion size can thus be made by varying the control input to the servo controlled dough metering device.

As the dough portion falls from the proofer tray it directs the portion to the scale conveyors. The scale conveyors are supported by a load cell which provides an indication of the displacement of a resilient counterforce due to the weight of the portion. Various types of counterforces, such as springs or elastomeric materials, can be used in the load cell. The displacement of the counterforce can be measured most readily by devices which exhibit varying electrical properties under physical deformation or displacement, such as strain gages, transducers or forced motor. The analog electrical indications generated by the load cell can be converted by an analog to digital converter ("A/D") to a digital signal compatible for input to the weight signal processor. The load cell used in the weighing mechanism may utilize a load cell body or counter force that is submerged in an engineered high density fluid to provide impact cushioning and limit the post impact oscillation ("ringing") of the counter force due to the impact of the dough portion on the scale receptacle.

The weight signal processor converts the electrical indications generated by the load cell at a sampling rate of up to 1,000 weight samples per second, and uses a computer algorithm to place these sample weight indications in to an array of selectable size for statistical analysis.

The array size is selected to encompass weight indications taken during a timeframe that is less than the interval during which a single portion is at rest on the load cell at production rates, so that the weight indications can be statistically analyzed to determine an accurate portion weight. Also, because an accurate net portion weight is dependent upon subtraction of an accurate weight of the empty load cell (tare weight) from the total load cell reading, the array size is also preferably selected to encompass a series of weight indications taken during a timeframe that is also less than the interval between the time a portion is fully removed from the load cell and the time the next portion is first deposited in contact with the load cell, so that the weight indications of the empty load cell during production conditions can be statistically analyzed to determine an accurate tare weight.

Because production rates can be in the range of 180 portions per minute or more, the cycle time for loading and unloading a single portion is one third of a second. Accordingly, the array size for the fully loaded and unloaded time intervals within that cycle will be on the order of 0.1 seconds, or approximately 100 samples each. These intervals represent the time while the single dough portion is at rest on the scale or alternatively when there is no dough portion on the scale. The algorithm is thus devised to identify arrays of sequential sample indications which fall within a predetermined standard deviation of the average weight indication of the array. By rejecting arrays having erratic weight indications outside of the standard deviation, only the arrays which do not include weight indications taken while the dough portion is either being placed on the load cell or removed from the load cell will be used to determine the tare weight and the net portion weight and to control the portion size produced by the dough divider. This algorithm eliminates data samples which do not provide valid indications of the load cell with the dough portion in place or alternatively the unloaded load cell.

These samples enter and exit the array first-in, first-out (FIFO) order. The standard deviation of the data in the array is recalculated upon the entry of every new sample. When the standard deviation of the weight samples is within the predetermined level, indicating that the array represents data taken during the time that a single dough portion is at rest on the scale or alternatively when there is no dough portion on the scale, an averaged weight is calculated using the array data. If the calculated average weight indication is above the predetermined tare setpoint, it is determined to be near the prior calculated individual dough piece weight plus the pr or calculated tare weight, and a new individual dough piece weight is calculated using the new average individual dough piece weight minus the current calculated tare weight. Alternatively, if the calculated average weight indication is below the predetermined tare setpoint, it is determined to be near the prior calculated tare weight, and the new calculated average weight indication is used as the new tare weight. When the standard deviation of the weight samples exceeds the predetermined level, the weight data in the array includes readings taken when the conveyor is either loading or unloading a dough piece and is not used. This process is repeated for successive array data to compile a sample group of dough portico weights which can be averaged and filtered and compared to the desired portion weight.

The weight signal processor 18 compares the weight of each dough portion in each sample group to the desired dough portion weight and automatically calculates a signal which is sent to the controller of the dough dividing device 14 to increase or decrease the amount of dough passing through the cutting mechanism 15 during each cut cycle, thereby providing continuous divided dough weight monitoring and control.

BRIEF DESCRIPTION OF THE DRAWINGS

The invention will, now be further described in conjunction with the drawings, in which.

These drawings are provided for illustrative purposes only and should not be used to unduly limit the scope of the Invention.

DETAILED DESCRIPTION OF THE PREFERRED EMBODIMENT

Figure 1:
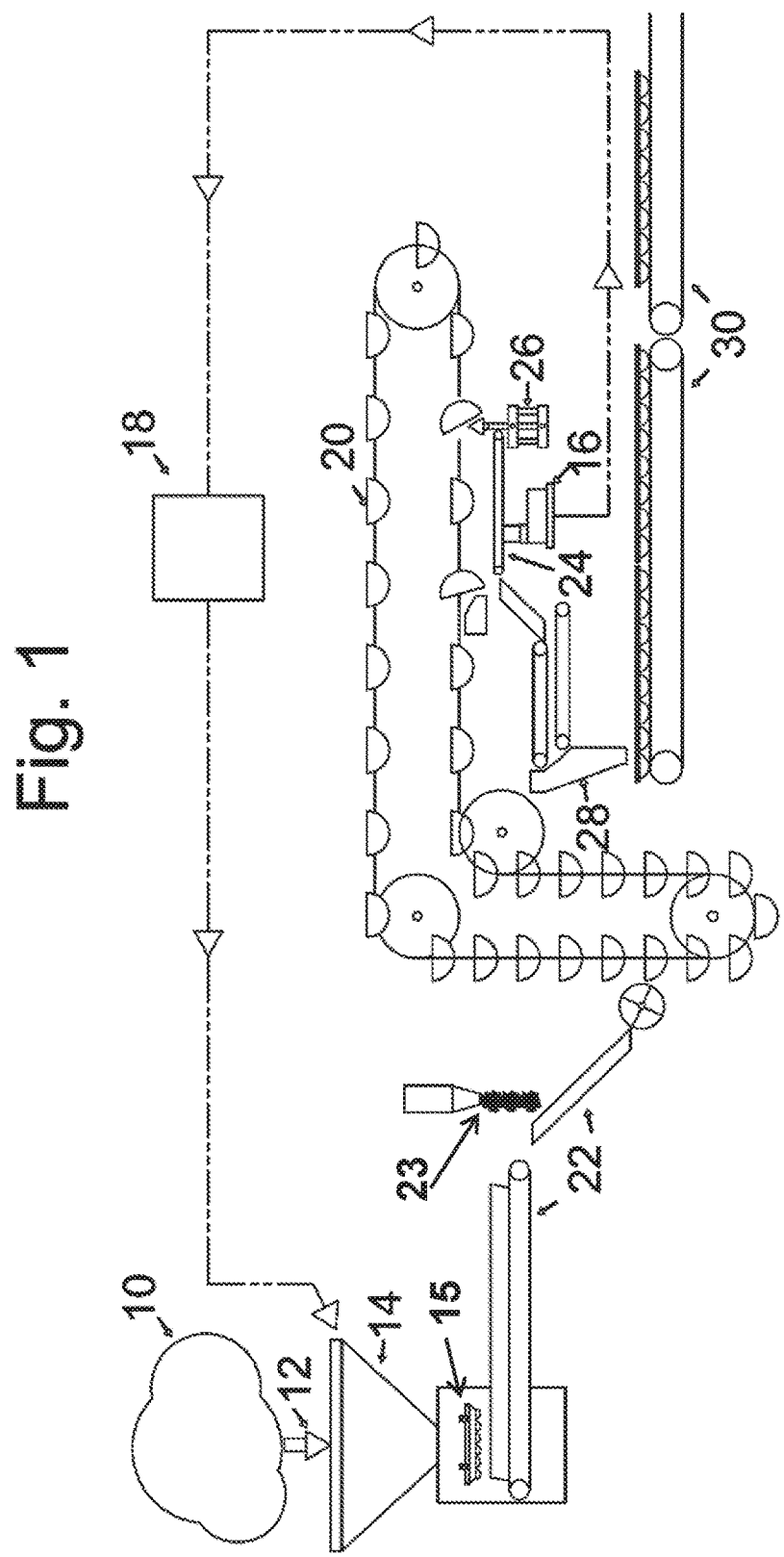
FIG. 1 is a diagram illustrating the system and method of one embodiment of the present invention with a typical arrangement of dough processing equipment in a commercial bakery for buns, rolls, or muffins.

As shown in FIG. 1, one embodiment of the present invention comprises a dough production mechanism 10, a dough feed mechanism 12, a dough dividing mechanism 14, a weighing mechanism 16, a weight signal processor 18 to calculate and transmit appropriate control signals to the dough feed mechanism 12, proofer mechanism 20, a conveyor system 22 configured to transport dough portions from the dividing mechanism to the proofer mechanism 20, a weighing conveyor 24, a tipping mechanism 26 to place dough portions on the weighing conveyors 24, that reinsert the dough pieces in position for further processing. The speed of the weighing conveyor is variable to accommodate the range of production speeds. FIG. 1 illustrates a typical dough divider 14 having a cutting blade 15 that is capable of cutting dough pieces at very high production rates. Once portioned, the dough pieces fall to a rounder conveyor 22 that shapes the dough pieces into spheres and delivers them to a flouring area 23, where the dough pieces are loaded in to the proofer trays on proofer 20. The dough pieces are allowed to rest as they are conveyed through the proofer 20. As illustrated in FIG. 1, a servo driven weighing conveyor 24 is positioned under the proofer 20 supported by support structure. The conveyor runs at the same speed and direction as the proofer 20. When a weight sample is taken, a pneumatic tray tipper 26 extends, causing the dough pieces to fall onto the weighing conveyor 24. As the dough pieces are conveyed the weigh cell 16 that the servo weigh conveyor is mounted to, provides very precise weight samples at up to 1,000 times per second. Weigh cell 16 delivers this information to a computer 18 for processing. As the dough pieces are transported off of the weighing conveyor 24, they are conveyed to a moulder 28 and fed into baking pans on a pan indexing conveyor 30.

The weight data is processed by an algorithm running on the computer. In the algorithm, the weights of samples are placed in to an array of selectable size. These sample weights enter and exit the array first-in first-out order. The standard deviation of the data in the array is recalculated when each, new sample weight is processed.

Figure 2:
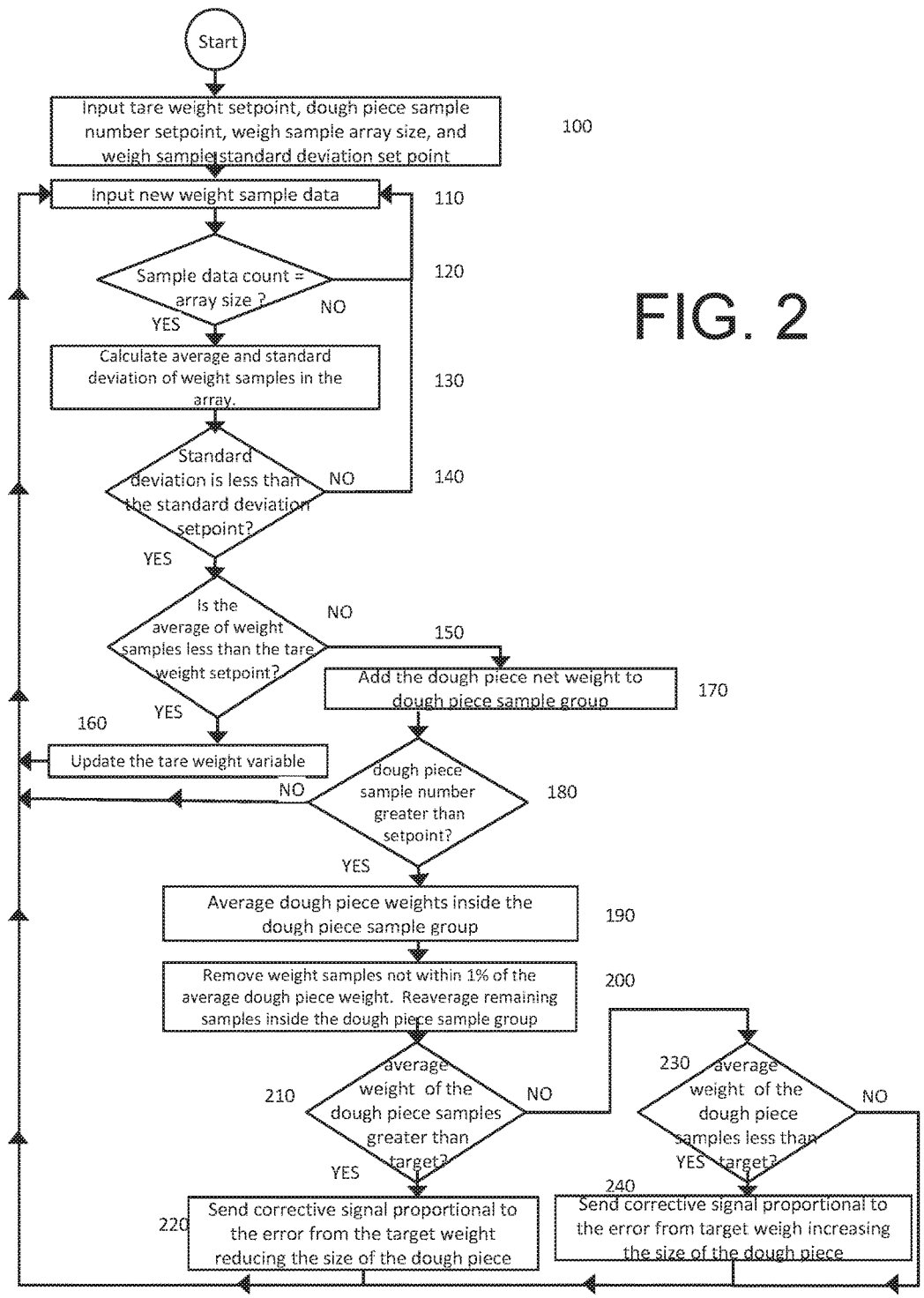
FIG. 2 is a flow chart diagram illustrating the method of one embodiment of the present invention.

FIG. 2 is a flow chart diagram illustrating the method of one embodiment of the present invention. As shown in FIG. 2, at step 100, the tare setpoint, desired array size and the predetermined standard deviation are input.

At step 120, if the new weight sample along with the prior weight samples input are sufficient in number to complete the array, the process proceeds to step 130. If the sample count data points in the array is not sufficient to complete the array, the process reverts to step 110 for input of additional weight sample data.

If the array was previously full, as each new weight sample data is added, the oldest prior weight sample data entry is deleted from the array.

At step 130, the average and standard deviation of the data in the array are calculated. At step 140, if the standard deviation is less than the predetermined standard deviation limit, the process continues to step 150. If the standard deviation exceeds the predetermined limit, the process reverts to step 110 for the input of additional weight sample data until the data in the array is sufficiently consistent to meet the standard deviation limitation.

At step 150, the average of the array weight samples is compared to the predetermined tare setpoint. If the average weight is less than the tare setpoint, the array comprises weight sample data from the unloaded loadcell, and is used to update the tare weight variable at step 160. This updated tare weight variable is subsequently used to calculate the net weight of the dough portions. Upon completion of this updating of the tare weight variable, the process reverts to step 110 for the input of additional weight sample data.

Alternatively, if the average weight of the array data is greater than the tare set point, the data represents loadcell indications taken while a dough portion is at rest on the load cell, and the tare weight variable is subtracted from this average loadcell reading to calculate the dough piece net weight at step 170. This dough piece net weight data is also included in the dough piece sample set at step 170.

The dough piece sample group is of a user selected size, normally comprising a group of 8 to 12 dough piece weights. This group of weights is averaged and compared to the desired dough piece weight to determine if a corrective signal is required.

As shown in step 180, if the number of dough piece sample data points is less than the predetermined number of dough piece samples in the group, the process reverts back to step 110 for the input of further data. Alternatively, if the dough piece sample group size is sufficient, at step 190 the average of the dough piece weight data in the dough sample group is calculated.

Various methods of filtering the data in the dough sample group may be used. For example, as illustrated in step 200, any weight sample data varying more than 1% from the average dough piece weight can be eliminated from the dough sample group, and then the average dough piece weight to is recalculated using the more restrictive sample group data, to provide an average which is unaffected by erratic sample weight data. Other methods to filter data include eliminating the two data points in each sample group having the greatest deviation from the average dough piece weight data and to then recalculate the average dough piece weight using the more restrictive sample group data.

As shown in step 210, if the average, weight of the dough pieces in the filtered sample group is greater than the target weight, at step 220, a corrective signal proportional to the deviation from the target weight is sent to the dough divider to reduce the size of the dough piece. After the corrective signal is sent to the dough divider, the process reverts back to step 110.

Conversely if the average weight of the dough pieces is not greater than the target portion weight, at step 230 if the average of the sample group is less then the desired portion weight, at step 240, a corrective signal proportional to the deviation from the target weight is sent to the dough divider to increase the size of the dough piece. After the corrective signal is sent to the dough divider, the process reverts back to step 110.

If the sample group average weight is equal to the target weight, no corrective signal is sent to the dough divider, and the process reverts to step 110.

The weight signal processor 18 compares the weight, of each dough portion in each group to the desired dough portion weight and automatically calculates a signal which is sent to the controller of the dough divider 14 to increase or decrease the amount of dough passing through the cutting mechanism during each cut cycle, thereby providing continuous divided dough weight monitoring and control.

In one embodiment, the present invention comprises a mechanism that produces semi-solid dough, a dividing mechanism that divides the semi-solid matter into portions and a motor-driven device that feeds the semi-solid matter to the dividing mechanism and has an operating rate that is controlled by inputting a control signal. The control signal corresponds to a numerical value, and the motor-driven device has an upper operating rate corresponding to an upper operating rate control signal, at which rate portions having maximum weight are divided, and a lower operating rate corresponding to a lower operating rate control signal, at which rate minimum weight portions are divided. The step of adjusting the control signal according to the difference between the average weight and the sum of the target weight and the tare weight comprises adjusting the numerical value of the operating rate control signal by an amount equal to the difference between the numerical value of the upper operating rate control signal and the numerical value of the lower operating rate control signal, multiplied by the (sum of the target weight and the tare weight less the average weight), multiplied by a predetermined moderating factor. The predetermined moderating factor is preferably the reciprocal of the target weight, or some fractional part of the reciprocal of the target weight.

Thus, in one embodiment, the present invention comprises a method of continuously dividing a mass of semi-solid matter into a plurality of portions, each portion having a preselected target weight, including the steps of:

providing a dividing mechanism that divides the semi-solid matter into portions and a motor-driven device that feeds the semi-sold matter to the dividing mechanism and has an operating rate that is controlled by inputting a control signal;

providing a conveyor to transport the portions and a load cell which supports a segment of the conveyor and, provides an indication of the weight of the segment of the conveyor and the weight of the portions on the segment of the conveyor;

inputting an initial operating rate control signal to the motor-driven device;

inputting an initial tare weight for the segment of the conveyor; dividing portions of semi-solid matter from the mass using the dividing mechanism;

obtaining a group of a predetermined number of successive weight indications from the load cell; calculating the average weight indication of the group;

determining whether of the weight indications in the group fall within a predetermined standard deviation of the average weight indication of the group, and if so, calculating the difference between the average weight and the sum of the target weight and the tare weight of the segment of the conveyor;

and if the difference is less than a predetermined tare setpoint using the average weight as the tare weight for subsequent weight indications;

and if the difference is greater than the predetermined tare setpoint, including the average weight indication in an array of a predetermined number of weight samples, calculating the average of the weight samples in the array, and adjusting the control signal according to the difference between the average sample weight and the sum of the target weight and the tare weight.

In another embodiment, the present invention comprises a n apparatus for producing a plurality of portions of semi-solid matter, each portion having a substantially uniform preselected target weight, including means for producing the semi-solid matter, a receptacle for receiving the output of the production means having an outlet, means adjacent to said outlet for feeding the matter to a dividing means at a rate which varies in response to a control signal, a dividing means downstream from the feeding means for dividing said matter into portions, a weighing conveyor downstream from said dividing means for transporting said portions and having a load cell for producing indications representative of the weights of said portions on a segment of the conveyor, and a processor in communication with the matter feeding means and weighing means for providing an operating rate control signal to the matter feeding means.

The processor is programmed to receive a group of a predetermined number of successive weight indications from the weighing conveyor, calculate the average weight indication of the group, determine whether all of the weight indications in the group fall within a predetermined standard deviation of the average weight indication of the group, and if so, calculate the difference between the average weight and the sum of the target weight and the tare weight of the segment of the conveyor and if the difference is less than a predetermined tare setpoint, to use the average weight as the tare weight for subsequent weight indications; and if the difference is greater than the predetermined tare setpoint, to include the average weight indication of the group in an array of a predetermined number of weight samples, calculate the average of the weight samples in the array, and adjust the control signal according to the difference between the average sample weight and the sum of the target weight and the tare weight.

As is known in the art, the method of one embodiment of the present invention can be utilized with multiple weigh cells 16 to accommodate a proofer 20 designed for multiple lanes of dough piece processing. The support structure can be made wide enough for multiple servo-driven weighing conveyors.

Although the subject invention has been described in, use primarily with respect to dough, the invention is applicable to many other production processes involving controlled weight portions of semi-solid matter, including but not limited to agricultural and food products, polymers, plastics, resins, cellulose, gelatins, refractory products, ceramics and the like. Many changes, modifications, variations, combinations, subcombinations and other uses and applications of the subject invention will be and become apparent to those skilled in the art after considering this specification and the accompanying drawings, which disclose a preferred embodiment thereof. All such changes, modifications, variations, and other uses and applications that do not depart from the spirit and scope of the invention are deemed to be covered by the invention, which is to be limited only by the claims which follow.

What is claimed is:

1. An apparatus for dividing a continuous flow of dough into a plurality of portions, each portion having a substantially uniform preselected target weight, comprising:
   a dough divider configured to receive the continuous flow of dough and to divide the dough into portions sized in proportion to an operating rate that is controlled by an operating rate control signal;
   a proofer downstream from said dough divider configured to receive and transport the individual dough pieces as they are released from the dough divider;
   a weighing conveyor downstream from said proofer configured to receive and transport said portions at an average speed equal to the speed of the proofer, the weighing conveyor having a load cell configured for producing indications representative of the weights of a portion resting for an interval in a resting position on a segment of the conveyor positioned over the load cell, the weighing conveyor having a servo motor which is programmed to drive the conveyor and to stop the conveyor for the interval in the resting position so that each successive dough piece is positioned to rest on the segment of the conveyor positioned over the load cell; and,
   a processor in electrical communication with the dough divider and the load cell, the processor programmed to:
      send the operating rate control signal to the dough divider,
      receive a group of a predetermined number of successive weight indications from the load cell,
      calculate the average weight indication of the group,
      determine whether all of the weight indications in the group fall within a predetermined standard deviation of the average weight indication of the group, and if so,
      calculate the difference between the average weight and the sum of the target weight and the tare weight of the segment of the conveyor;
   and if the difference is less than a predetermined tare setpoint, to use the average weight as the tare weight for subsequent weight indications;
   and if the difference is greater than the predetermined tare setpoint, to include the average weight indication of the group in an array of a predetermined number of weight samples,
      calculate the average of the weight samples in the array, and adjust the operating rate control signal according to the difference between the average sample weight and the sum of the preselected target weight and the tare weight.

2. The apparatus of claim 1 wherein the segment of the conveyor positioned over the load cell is configured to accommodate a single portion, and the predetermined number of successive weight indications received from the load cell is selected to encompass a time period less than the interval between loading the positioning of successive portions in the resting position on the segment of the conveyor positioned over the load cell.

3. The apparatus of claim 2 wherein the predetermined number of successive weight indications received from the load cell is selected to encompass a time period less than the interval during which a single portion rests on the segment of the conveyor positioned over the load cell.

4. The apparatus of claim 2 wherein the predetermined number of successive weight indications received from the load cell is selected to encompass a time period less than the interval between the movement of a single portion away from en the conveyor segment and the positioning of the next successive portion on the segment of the conveyor positioned over the load cell.

5. The apparatus of claim 1 wherein the load cell comprises a high precision electromagnetic force coil weigh cell.

6. The apparatus of claim 1 further comprising a tipper downstream from said proofer and wherein the proofer comprises trays which are tipped by the tipper to allow the portion to fall to the weighing conveyor.

* * * * *